United States Patent
Dravid et al.

(10) Patent No.: US 11,196,640 B2
(45) Date of Patent: *Dec. 7, 2021

(54) RELEASING AND RETAINING RESOURCES FOR USE IN A NFV ENVIRONMENT

(71) Applicant: Cisco Technology, Inc., San Jose, CA (US)

(72) Inventors: Vipin Dravid, Fremont, CA (US); Varun Ponkshe, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/941,336

(22) Filed: Jul. 28, 2020

(65) Prior Publication Data
US 2020/0358666 A1   Nov. 12, 2020

Related U.S. Application Data

(63) Continuation of application No. 15/625,032, filed on Jun. 16, 2017, now Pat. No. 10,735,275.

(51) Int. Cl.
*H04L 12/24* (2006.01)
*G06F 9/50* (2006.01)
*H04L 12/927* (2013.01)

(52) U.S. Cl.
CPC ............ *H04L 41/22* (2013.01); *G06F 9/5022* (2013.01); *H04L 41/0806* (2013.01);
(Continued)

(58) Field of Classification Search
CPC . H04L 41/22; H04L 41/0806; H04L 41/0896; H04L 41/5054; H04L 47/803; G06F 9/5022; G06F 2209/5014
See application file for complete search history.

(56) References Cited

U.S. PATENT DOCUMENTS 3,629,512 A   12/1971   Yuan
4,769,811 A   9/1988   Eckberg, Jr. et al.
(Continued)

FOREIGN PATENT DOCUMENTS

CN   103716123   4/2014
CN   103716137   4/2014
(Continued)

OTHER PUBLICATIONS

International Search Report and Written Opinion from the International Searching Authority, dated Sep. 19, 2018, 9 pages, for corresponding International Patent Application No. PCT/US2018/036603.

(Continued)

*Primary Examiner* — Blake J Rubin
(74) *Attorney, Agent, or Firm* — Polsinelli PC (57) ABSTRACT

A virtual network function (VNF) management system includes a computer-executable set of instructions to deploy a VNF using one or more resources allocated for use by the VNF in which the one or more resources are allocated by communicating with a resource manager that manages the one or more resources. The system then receives a request from a user interface to un-deploy the VNF, and un-deploys the VNF while keeping the resources allocated for use by the VNF. At a later time, the system can then receive a request to restore the VNF from the user interface, and deploy the VNF again using the allocated resources.

20 Claims, 6 Drawing Sheets

(52) U.S. Cl.
CPC ...... *H04L 41/0896* (2013.01); *H04L 41/5054* (2013.01); *H04L 47/803* (2013.01); *G06F 2209/5014* (2013.01)

(56) References Cited

U.S. PATENT DOCUMENTS

| | | | |
|---|---|---|---|
| 5,408,231 A | 4/1995 | Bowdon | |
| 5,491,690 A | 2/1996 | Alfonsi et al. | |
| 5,557,609 A | 9/1996 | Shobatake et al. | |
| 5,600,638 A | 2/1997 | Bertin et al. | |
| 5,687,167 A | 11/1997 | Bertin et al. | |
| 6,115,384 A | 9/2000 | Parzych | |
| 6,167,438 A | 12/2000 | Yates et al. | |
| 6,400,681 B1 | 6/2002 | Bertin et al. | |
| 6,661,797 B1 | 12/2003 | Goel et al. | |
| 6,687,229 B1 | 2/2004 | Kataria et al. | |
| 6,799,270 B1 | 9/2004 | Bull et al. | |
| 6,888,828 B1 | 5/2005 | Partanen et al. | |
| 6,993,593 B2 | 1/2006 | Iwata | |
| 7,027,408 B2 | 4/2006 | Nabkel et al. | |
| 7,062,567 B2 | 6/2006 | Benitez et al. | |
| 7,095,715 B2 | 8/2006 | Buckman et al. | |
| 7,096,212 B2 | 8/2006 | Tribble et al. | |
| 7,139,239 B2 | 11/2006 | Mcfarland et al. | |
| 7,165,107 B2 | 1/2007 | Pouyoul et al. | |
| 7,197,008 B1 | 3/2007 | Shabtay et al. | |
| 7,197,660 B1 | 3/2007 | Liu et al. | |
| 7,209,435 B1 | 4/2007 | Kuo et al. | |
| 7,227,872 B1 | 6/2007 | Biswas et al. | |
| 7,231,462 B2 | 6/2007 | Berthaud et al. | |
| 7,333,990 B1 | 2/2008 | Thiagarajan et al. | |
| 7,443,796 B1 | 10/2008 | Albert et al. | |
| 7,458,084 B2 | 11/2008 | Zhang et al. | |
| 7,472,411 B2 | 12/2008 | Wing et al. | |
| 7,486,622 B2 | 2/2009 | Regan et al. | |
| 7,536,396 B2 | 5/2009 | Johnson et al. | |
| 7,552,201 B2 | 6/2009 | Areddu et al. | |
| 7,558,261 B2 | 7/2009 | Arregoces et al. | |
| 7,567,504 B2 | 7/2009 | Darling et al. | |
| 7,571,470 B2 | 8/2009 | Arregoces et al. | |
| 7,573,879 B2 | 8/2009 | Narad et al. | |
| 7,610,375 B2 | 10/2009 | Portolani et al. | |
| 7,643,468 B1 | 1/2010 | Arregoces et al. | |
| 7,644,182 B2 | 1/2010 | Banerjee et al. | |
| 7,647,422 B2 | 1/2010 | Singh et al. | |
| 7,657,898 B2 | 2/2010 | Sadiq | |
| 7,657,940 B2 | 2/2010 | Portolani et al. | |
| 7,668,116 B2 | 2/2010 | Wijnands et al. | |
| 7,684,321 B2 | 3/2010 | Muirhead et al. | |
| 7,738,469 B1 | 6/2010 | Shekokar et al. | |
| 7,751,409 B1 | 7/2010 | Carolan | |
| 7,793,157 B2 | 9/2010 | Bailey et al. | |
| 7,814,284 B1 | 10/2010 | Glass et al. | |
| 7,831,693 B2 | 11/2010 | Lai | |
| 7,852,785 B2 | 12/2010 | Lund et al. | |
| 7,860,095 B2 | 12/2010 | Forissier et al. | |
| 7,860,100 B2 | 12/2010 | Khalid et al. | |
| 7,895,425 B2 | 2/2011 | Khalid et al. | |
| 7,899,012 B2 | 3/2011 | Ho et al. | |
| 7,899,861 B2 | 3/2011 | Feblowitz et al. | |
| 7,907,595 B2 | 3/2011 | Khanna et al. | |
| 7,908,480 B2 | 3/2011 | Firestone et al. | |
| 7,983,174 B1 | 7/2011 | Monaghan et al. | |
| 7,990,847 B1 | 8/2011 | Leroy et al. | |
| 8,000,329 B2 | 8/2011 | Fendick et al. | |
| 8,018,938 B1 | 9/2011 | Fromm et al. | |
| 8,094,575 B1 | 1/2012 | Vadlakonda et al. | |
| 8,095,683 B2 | 1/2012 | Balasubramaniam Chandra | |
| 8,116,307 B1 | 2/2012 | Thesayi et al. | |
| 8,166,465 B2 | 4/2012 | Feblowitz et al. | |
| 8,180,909 B2 | 5/2012 | Hartman et al. | |
| 8,191,119 B2 | 5/2012 | Wing et al. | |
| 8,195,774 B2 | 6/2012 | Lambeth et al. | |
| 8,280,354 B2 | 10/2012 | Smith et al. | |
| 8,281,302 B2 | 10/2012 | Durazzo et al. | |
| 8,291,108 B2 | 10/2012 | Raja et al. | |
| 8,305,900 B2 | 11/2012 | Bianconi | |
| 8,311,045 B2 | 11/2012 | Quinn et al. | |
| 8,316,457 B1 | 11/2012 | Paczkowski et al. | |
| 8,355,332 B2 | 1/2013 | Beaudette et al. | |
| 8,442,043 B2 | 5/2013 | Sharma et al. | |
| 8,451,817 B2 | 5/2013 | Cheriton | |
| 8,464,336 B2 | 6/2013 | Wei et al. | |
| 8,473,981 B1 | 6/2013 | Gargi | |
| 8,479,298 B2 | 7/2013 | Keith et al. | |
| 8,498,414 B2 | 7/2013 | Rossi | |
| 8,520,672 B2 | 8/2013 | Guichard et al. | |
| 8,601,152 B1 | 12/2013 | Chou | |
| 8,605,588 B2 | 12/2013 | Sankaran et al. | |
| 8,612,612 B1 | 12/2013 | Dukes et al. | |
| 8,627,328 B2 | 1/2014 | Mousseau et al. | |
| 8,645,952 B2 | 2/2014 | Biswas et al. | |
| 8,676,965 B2 | 3/2014 | Gueta | |
| 8,676,980 B2 | 3/2014 | Kreeger et al. | |
| 8,700,892 B2 | 4/2014 | Bollay et al. | |
| 8,724,466 B2 | 5/2014 | Kenigsberg et al. | |
| 8,730,980 B2 | 5/2014 | Bagepalli et al. | |
| 8,743,885 B2 | 6/2014 | Khan et al. | |
| 8,751,420 B2 | 6/2014 | Hjelm et al. | |
| 8,762,534 B1 | 6/2014 | Hong et al. | |
| 8,762,707 B2 | 6/2014 | Killian et al. | |
| 8,792,490 B2 | 7/2014 | Jabr et al. | |
| 8,793,400 B2 | 7/2014 | Mcdysan et al. | |
| 8,812,730 B2 | 8/2014 | Vos et al. | |
| 8,819,419 B2 | 8/2014 | Carlson et al. | |
| 8,825,070 B2 | 9/2014 | Akhtar et al. | |
| 8,830,834 B2 | 9/2014 | Sharma et al. | |
| 8,904,037 B2 | 12/2014 | Haggar et al. | |
| 8,984,284 B2 | 3/2015 | Purdy, Sr. et al. | |
| 9,001,827 B2 | 4/2015 | Appenzeller | |
| 9,071,533 B2 | 6/2015 | Hui et al. | |
| 9,077,661 B2 | 7/2015 | Andreasen et al. | |
| 9,088,584 B2 | 7/2015 | Feng et al. | |
| 9,130,872 B2 | 9/2015 | Kumar et al. | |
| 9,143,438 B2 | 9/2015 | Khan et al. | |
| 9,160,797 B2 | 10/2015 | Mcdysan | |
| 9,178,812 B2 | 11/2015 | Guichard et al. | |
| 9,189,285 B2 | 11/2015 | Ng et al. | |
| 9,203,711 B2 | 12/2015 | Agarwal et al. | |
| 9,253,274 B2 | 2/2016 | Quinn et al. | |
| 9,300,579 B2 | 3/2016 | Frost et al. | |
| 9,300,585 B2 | 3/2016 | Kumar et al. | |
| 9,311,130 B2 | 4/2016 | Christenson et al. | |
| 9,319,324 B2 | 4/2016 | Beheshti-Zavareh et al. | |
| 9,325,565 B2 | 4/2016 | Yao et al. | |
| 9,338,097 B2 | 5/2016 | Anand et al. | |
| 9,344,337 B2 | 5/2016 | Kumar et al. | |
| 9,374,297 B2 | 6/2016 | Bosch et al. | |
| 9,379,931 B2 | 6/2016 | Bosch et al. | |
| 9,385,950 B2 | 7/2016 | Quinn et al. | |
| 9,398,486 B2 | 7/2016 | La Roche, Jr. et al. | |
| 9,407,540 B2 | 8/2016 | Kumar et al. | |
| 9,413,655 B2 | 8/2016 | Shatzkamer et al. | |
| 9,424,065 B2 | 8/2016 | Singh et al. | |
| 9,436,443 B2 | 9/2016 | Chiosi et al. | |
| 9,444,675 B2 | 9/2016 | Guichard et al. | |
| 9,460,286 B1 | 10/2016 | Felstaine et al. | |
| 9,473,570 B2 | 10/2016 | Bhanujan et al. | |
| 9,479,443 B2 | 10/2016 | Bosch et al. | |
| 9,491,094 B2 | 11/2016 | Patwardhan et al. | |
| 9,537,836 B2 | 1/2017 | Maller et al. | |
| 9,558,029 B2 | 1/2017 | Behera et al. | |
| 9,559,970 B2 | 1/2017 | Kumar et al. | |
| 9,571,405 B2 | 2/2017 | Pignataro et al. | |
| 9,608,896 B2 | 3/2017 | Kumar et al. | |
| 9,614,739 B2 | 4/2017 | Kumar et al. | |
| 9,660,909 B2 | 5/2017 | Guichard et al. | |
| 9,723,106 B2 | 8/2017 | Shen et al. | |
| 9,774,533 B2 | 9/2017 | Zhang et al. | |
| 9,794,379 B2 | 10/2017 | Kumar et al. | |
| 9,853,914 B1 | 12/2017 | Felstaine et al. | |
| 9,882,776 B2 | 1/2018 | Aybay et al. | |
| 9,882,828 B1* | 1/2018 | Sandlerman | H04L 47/74 |
| 9,929,945 B2 | 3/2018 | Schultz et al. | |

(56) References Cited

U.S. PATENT DOCUMENTS

| | | |
|---|---|---|
| 10,003,530 B2 | 6/2018 | Zhang et al. |
| 10,187,260 B1 | 1/2019 | Chen et al. |
| 10,248,472 B2 | 4/2019 | Erickson et al. |
| 10,931,525 B2 * | 2/2021 | Iovene ............... H04L 41/0896 |
| 2001/0023442 A1 | 9/2001 | Masters |
| 2002/0085562 A1 | 7/2002 | Hufferd et al. |
| 2002/0131362 A1 | 9/2002 | Callon |
| 2002/0156893 A1 | 10/2002 | Pouyoul et al. |
| 2002/0167935 A1 | 11/2002 | Nabkel et al. |
| 2003/0023879 A1 | 1/2003 | Wray |
| 2003/0026257 A1 | 2/2003 | Xu et al. |
| 2003/0037070 A1 | 2/2003 | Marston |
| 2003/0088698 A1 | 5/2003 | Singh et al. |
| 2003/0110081 A1 | 6/2003 | Tosaki et al. |
| 2003/0120816 A1 | 6/2003 | Berthaud et al. |
| 2003/0214913 A1 | 11/2003 | Kan et al. |
| 2003/0226142 A1 | 12/2003 | Rand |
| 2004/0109412 A1 | 6/2004 | Hansson et al. |
| 2004/0148391 A1 | 7/2004 | Shannon, Sr. et al. |
| 2004/0199812 A1 | 10/2004 | Earl |
| 2004/0213160 A1 | 10/2004 | Regan et al. |
| 2004/0264481 A1 | 12/2004 | Darling et al. |
| 2004/0268357 A1 | 12/2004 | Joy et al. |
| 2005/0044197 A1 | 2/2005 | Lai |
| 2005/0058118 A1 | 3/2005 | Davis |
| 2005/0060572 A1 | 3/2005 | Kung |
| 2005/0086367 A1 | 4/2005 | Conta et al. |
| 2005/0120101 A1 | 6/2005 | Nocera |
| 2005/0152378 A1 | 7/2005 | Bango et al. |
| 2005/0157645 A1 | 7/2005 | Rabie et al. |
| 2005/0160180 A1 | 7/2005 | Rabje et al. |
| 2005/0204042 A1 | 9/2005 | Banerjee et al. |
| 2005/0210096 A1 | 9/2005 | Bishop et al. |
| 2005/0257002 A1 | 11/2005 | Nguyen |
| 2005/0281257 A1 | 12/2005 | Yazaki et al. |
| 2005/0286540 A1 | 12/2005 | Hurtta et al. |
| 2005/0289244 A1 | 12/2005 | Sahu et al. |
| 2006/0005240 A1 | 1/2006 | Sundarrajan et al. |
| 2006/0031374 A1 | 2/2006 | Lu et al. |
| 2006/0045024 A1 | 3/2006 | Previdi et al. |
| 2006/0074502 A1 | 4/2006 | Mcfarland |
| 2006/0092950 A1 | 5/2006 | Arregoces et al. |
| 2006/0095960 A1 | 5/2006 | Arregoces et al. |
| 2006/0112400 A1 | 5/2006 | Zhang et al. |
| 2006/0155862 A1 | 7/2006 | Kathi et al. |
| 2006/0168223 A1 | 7/2006 | Mishra et al. |
| 2006/0233106 A1 | 10/2006 | Achlioptas et al. |
| 2006/0233155 A1 | 10/2006 | Srivastava |
| 2007/0061441 A1 | 3/2007 | Landis et al. |
| 2007/0067435 A1 | 3/2007 | Landis et al. |
| 2007/0094397 A1 | 4/2007 | Krelbaum et al. |
| 2007/0143851 A1 | 6/2007 | Nicodemus et al. |
| 2007/0237147 A1 | 10/2007 | Quinn et al. |
| 2007/0250836 A1 | 10/2007 | Li et al. |
| 2008/0056153 A1 | 3/2008 | Liu |
| 2008/0080509 A1 | 4/2008 | Khanna et al. |
| 2008/0080517 A1 | 4/2008 | Roy et al. |
| 2008/0170542 A1 | 7/2008 | Hu |
| 2008/0177896 A1 | 7/2008 | Quinn et al. |
| 2008/0181118 A1 | 7/2008 | Sharma et al. |
| 2008/0196083 A1 | 8/2008 | Parks et al. |
| 2008/0209039 A1 | 8/2008 | Tracey et al. |
| 2008/0219287 A1 | 9/2008 | Krueger et al. |
| 2008/0225710 A1 | 9/2008 | Raja et al. |
| 2008/0291910 A1 | 11/2008 | Tadimeti et al. |
| 2009/0003364 A1 | 1/2009 | Fendick et al. |
| 2009/0006152 A1 | 1/2009 | Timmerman |
| 2009/0037713 A1 | 2/2009 | Khalid et al. |
| 2009/0094684 A1 | 4/2009 | Chinnusamy et al. |
| 2009/0204612 A1 | 8/2009 | Keshavarz-nia et al. |
| 2009/0271656 A1 | 10/2009 | Yokota et al. |
| 2009/0300207 A1 | 12/2009 | Giaretta et al. |
| 2009/0305699 A1 | 12/2009 | Deshpande et al. |
| 2009/0328054 A1 | 12/2009 | Paramasivam et al. |
| 2010/0058329 A1 | 3/2010 | Durazzo et al. |
| 2010/0063988 A1 | 3/2010 | Khalid |
| 2010/0080226 A1 | 4/2010 | Khalid |
| 2010/0165985 A1 | 7/2010 | Sharma et al. |
| 2010/0191612 A1 | 7/2010 | Raleigh |
| 2010/0211658 A1 | 8/2010 | Hoogerwerf et al. |
| 2011/0023090 A1 | 1/2011 | Asati et al. |
| 2011/0032833 A1 | 2/2011 | Zhang et al. |
| 2011/0055845 A1 | 3/2011 | Nandagopal |
| 2011/0131338 A1 | 6/2011 | Hu |
| 2011/0137991 A1 | 6/2011 | Russell |
| 2011/0142056 A1 | 6/2011 | Manoj |
| 2011/0161494 A1 | 6/2011 | Mcdysan et al. |
| 2011/0222412 A1 | 9/2011 | Kompella |
| 2011/0255538 A1 | 10/2011 | Srinivasan et al. |
| 2011/0267947 A1 | 11/2011 | Dhar et al. |
| 2012/0131662 A1 | 5/2012 | Kuik et al. |
| 2012/0147894 A1 | 6/2012 | Mulligan et al. |
| 2012/0324442 A1 | 12/2012 | Barde |
| 2012/0331135 A1 | 12/2012 | Alon et al. |
| 2013/0003735 A1 | 1/2013 | Chao et al. |
| 2013/0003736 A1 | 1/2013 | Szyszko et al. |
| 2013/0040640 A1 | 2/2013 | Chen et al. |
| 2013/0044636 A1 | 2/2013 | Koponen et al. |
| 2013/0121137 A1 | 5/2013 | Feng et al. |
| 2013/0124708 A1 | 5/2013 | Lee et al. |
| 2013/0163594 A1 | 6/2013 | Sharma et al. |
| 2013/0163606 A1 | 6/2013 | Bagepalli et al. |
| 2013/0238806 A1 | 9/2013 | Moen |
| 2013/0272305 A1 | 10/2013 | Lefebvre et al. |
| 2013/0311675 A1 | 11/2013 | Kancherla |
| 2013/0329584 A1 | 12/2013 | Ghose et al. |
| 2014/0010083 A1 | 1/2014 | Hamdi et al. |
| 2014/0010096 A1 | 1/2014 | Kamble et al. |
| 2014/0036730 A1 | 2/2014 | Nellikar et al. |
| 2014/0050223 A1 | 2/2014 | Foo et al. |
| 2014/0067758 A1 | 3/2014 | Boldyrev et al. |
| 2014/0105062 A1 | 4/2014 | McDysan et al. |
| 2014/0181267 A1 | 6/2014 | Wadkins et al. |
| 2014/0254603 A1 | 9/2014 | Banavalikar et al. |
| 2014/0259012 A1 | 9/2014 | Nandlall et al. |
| 2014/0279863 A1 | 9/2014 | Krishnamurthy |
| 2014/0280836 A1 | 9/2014 | Kumar et al. |
| 2014/0317261 A1 | 10/2014 | Shatzkamer et al. |
| 2014/0321459 A1 | 10/2014 | Kumar et al. |
| 2014/0334295 A1 | 11/2014 | Guichard et al. |
| 2014/0344439 A1 | 11/2014 | Kempf et al. |
| 2014/0362682 A1 | 12/2014 | Guichard et al. |
| 2014/0362857 A1 | 12/2014 | Guichard et al. |
| 2014/0369209 A1 | 12/2014 | Khurshid et al. |
| 2014/0376558 A1 | 12/2014 | Rao et al. |
| 2015/0003455 A1 | 1/2015 | Haddad et al. |
| 2015/0012584 A1 | 1/2015 | Lo et al. |
| 2015/0012988 A1 | 1/2015 | Jeng et al. |
| 2015/0029871 A1 | 1/2015 | Frost et al. |
| 2015/0032871 A1 | 1/2015 | Allan et al. |
| 2015/0052516 A1 | 2/2015 | French et al. |
| 2015/0071285 A1 | 3/2015 | Kumar et al. |
| 2015/0074276 A1 | 3/2015 | DeCusatis et al. |
| 2015/0082308 A1 | 3/2015 | Kiess et al. |
| 2015/0085635 A1 | 3/2015 | Wijnands et al. |
| 2015/0085870 A1 | 3/2015 | Narasimha et al. |
| 2015/0089082 A1 | 3/2015 | Patwardhan et al. |
| 2015/0092564 A1 | 4/2015 | Aldrin |
| 2015/0103827 A1 | 4/2015 | Quinn et al. |
| 2015/0117308 A1 | 4/2015 | Kant |
| 2015/0124622 A1 | 5/2015 | Kovvali et al. |
| 2015/0131484 A1 | 5/2015 | Aldrin |
| 2015/0131660 A1 | 5/2015 | Shepherd et al. |
| 2015/0156035 A1 | 6/2015 | Foo et al. |
| 2015/0180725 A1 | 6/2015 | Varney et al. |
| 2015/0180767 A1 | 6/2015 | Tam et al. |
| 2015/0181309 A1 | 6/2015 | Shepherd et al. |
| 2015/0188949 A1 | 7/2015 | Mahaffey et al. |
| 2015/0195197 A1 | 7/2015 | Yong et al. |
| 2015/0222516 A1 | 8/2015 | Deval et al. |
| 2015/0222533 A1 | 8/2015 | Birrittella et al. |
| 2015/0236948 A1 | 8/2015 | Dunbar et al. |
| 2015/0248461 A1 | 9/2015 | Theeten et al. |
| 2015/0319078 A1 | 11/2015 | Lee et al. |

(56) References Cited

U.S. PATENT DOCUMENTS

| | | | |
|---|---|---|---|
| 2015/0319081 A1 | 11/2015 | Kasturi et al. | |
| 2015/0326473 A1 | 11/2015 | Dunbar et al. | |
| 2015/0333930 A1 | 11/2015 | Aysola et al. | |
| 2015/0334027 A1 | 11/2015 | Bosch et al. | |
| 2015/0341285 A1 | 11/2015 | Aysola et al. | |
| 2015/0365495 A1 | 12/2015 | Fan et al. | |
| 2015/0381465 A1 | 12/2015 | Narayanan et al. | |
| 2015/0381557 A1 | 12/2015 | Fan et al. | |
| 2016/0028604 A1 | 1/2016 | Chakrabarti et al. | |
| 2016/0028640 A1 | 1/2016 | Zhang et al. | |
| 2016/0043952 A1 | 2/2016 | Zhang et al. | |
| 2016/0048403 A1 | 2/2016 | Bugenhagen | |
| 2016/0050117 A1 | 2/2016 | Voellmy et al. | |
| 2016/0050132 A1 | 2/2016 | Zhang | |
| 2016/0072724 A1 | 3/2016 | Amann et al. | |
| 2016/0080263 A1 | 3/2016 | Park et al. | |
| 2016/0080496 A1 | 3/2016 | Falanga et al. | |
| 2016/0099853 A1 | 4/2016 | Nedeltchev et al. | |
| 2016/0119159 A1 | 4/2016 | Zhao et al. | |
| 2016/0119253 A1 | 4/2016 | Kang et al. | |
| 2016/0127139 A1 | 5/2016 | Tian et al. | |
| 2016/0134518 A1 | 5/2016 | Callon et al. | |
| 2016/0134535 A1 | 5/2016 | Callon | |
| 2016/0139939 A1 | 5/2016 | Bosch et al. | |
| 2016/0164776 A1 | 6/2016 | Biancaniello | |
| 2016/0165014 A1 | 6/2016 | Nainar et al. | |
| 2016/0170848 A1 | 6/2016 | Yang et al. | |
| 2016/0173373 A1 | 6/2016 | Guichard et al. | |
| 2016/0173464 A1 | 6/2016 | Wang et al. | |
| 2016/0182336 A1 | 6/2016 | Doctor et al. | |
| 2016/0182342 A1 | 6/2016 | Singaravelu et al. | |
| 2016/0182684 A1 | 6/2016 | Connor et al. | |
| 2016/0212017 A1 | 7/2016 | Li et al. | |
| 2016/0226742 A1 | 8/2016 | Apathotharanan | |
| 2016/0239330 A1 | 8/2016 | Mc Bride et al. | |
| 2016/0248685 A1 | 8/2016 | Pignataro et al. | |
| 2016/0269925 A1 | 9/2016 | Chou et al. | |
| 2016/0277250 A1 | 9/2016 | Maes | |
| 2016/0285720 A1 | 9/2016 | Mäenpää et al. | |
| 2016/0323165 A1 | 11/2016 | Boucadair et al. | |
| 2016/0335111 A1 | 11/2016 | Bruun et al. | |
| 2016/0352629 A1 | 12/2016 | Wang et al. | |
| 2016/0352634 A1 | 12/2016 | Itsumi | |
| 2016/0353226 A1 | 12/2016 | Rao et al. | |
| 2016/0380966 A1 | 12/2016 | Gunnalan et al. | |
| 2017/0019303 A1 | 1/2017 | Swamy et al. | |
| 2017/0026235 A1 | 1/2017 | Famaey | |
| 2017/0031804 A1 | 2/2017 | Ciszewski et al. | |
| 2017/0063648 A1 | 3/2017 | Nadaf et al. | |
| 2017/0063714 A1 | 3/2017 | Xiang | |
| 2017/0068559 A1* | 3/2017 | Lee | G06F 9/45558 |
| 2017/0070594 A1 | 3/2017 | Oetting et al. | |
| 2017/0078175 A1 | 3/2017 | Xu et al. | |
| 2017/0078216 A1 | 3/2017 | Adolph et al. | |
| 2017/0116021 A1 | 4/2017 | Miller | |
| 2017/0126792 A1 | 5/2017 | Halpern et al. | |
| 2017/0141944 A1 | 5/2017 | Lee et al. | |
| 2017/0142206 A1 | 5/2017 | Kodaypak et al. | |
| 2017/0150399 A1 | 5/2017 | Kedalagudde et al. | |
| 2017/0187572 A1* | 6/2017 | Wu | H04L 41/145 |
| 2017/0187609 A1 | 6/2017 | Lee et al. | |
| 2017/0208000 A1 | 7/2017 | Bosch et al. | |
| 2017/0208147 A1 | 7/2017 | I'anson et al. | |
| 2017/0214627 A1 | 7/2017 | Zhang et al. | |
| 2017/0236105 A1 | 8/2017 | Feldpusch | |
| 2017/0237656 A1 | 8/2017 | Gage et al. | |
| 2017/0249180 A1 | 8/2017 | Chen et al. | |
| 2017/0250917 A1 | 8/2017 | Ruckstuhl et al. | |
| 2017/0272470 A1 | 9/2017 | Gundamaraju et al. | |
| 2017/0279712 A1 | 9/2017 | Nainar et al. | |
| 2017/0279923 A1 | 9/2017 | Kumar et al. | |
| 2017/0288971 A1* | 10/2017 | Jayaraman | H04L 41/5051 |
| 2017/0300352 A1 | 10/2017 | Lou et al. | |
| 2017/0310611 A1 | 10/2017 | Kumar et al. | |
| 2017/0311304 A1 | 10/2017 | Lu | |
| 2017/0318097 A1 | 11/2017 | Drew et al. | |
| 2017/0331741 A1 | 11/2017 | Fedyk et al. | |
| 2017/0331884 A1 | 11/2017 | Colle et al. | |
| 2017/0339023 A1 | 11/2017 | Aström et al. | |
| 2018/0013841 A1 | 1/2018 | Nainar et al. | |
| 2018/0026858 A1 | 1/2018 | Zhang et al. | |
| 2018/0026884 A1 | 1/2018 | Nainar et al. | |
| 2018/0026887 A1 | 1/2018 | Nainar et al. | |
| 2018/0041470 A1 | 2/2018 | Schultz et al. | |
| 2018/0062991 A1 | 3/2018 | Nainar et al. | |
| 2018/0069749 A1 | 3/2018 | Singhal et al. | |
| 2018/0091395 A1 | 3/2018 | Shinohara | |
| 2018/0123870 A1 | 5/2018 | Xue et al. | |
| 2018/0159735 A1 | 6/2018 | Beyh | |
| 2018/0176088 A1 | 6/2018 | Ellappan et al. | |
| 2018/0176886 A1* | 6/2018 | Kodaypak | H04W 76/10 |
| 2018/0183686 A1 | 6/2018 | Guillaume et al. | |
| 2018/0191838 A1 | 7/2018 | Friedman et al. | |
| 2018/0227182 A1 | 8/2018 | Patton et al. | |
| 2018/0262410 A1* | 9/2018 | Chou | H04L 41/5009 |
| 2018/0287902 A1 | 10/2018 | Chitalia et al. | |
| 2018/0314549 A1 | 11/2018 | Chokkalingam et al. | |
| 2018/0316559 A1 | 11/2018 | Thulasi et al. | |
| 2018/0316730 A1 | 11/2018 | Schaefer et al. | |
| 2018/0317134 A1* | 11/2018 | Leroux | H04W 24/02 |
| 2018/0324261 A1* | 11/2018 | Yi | H04L 67/16 |
| 2019/0052528 A1* | 2/2019 | Yoshimura | H04L 41/0896 |
| 2019/0052549 A1 | 2/2019 | Duggal et al. | |
| 2019/0052551 A1 | 2/2019 | Barczynski et al. | |
| 2019/0109756 A1 | 4/2019 | Abu Lebdeh et al. | |
| 2019/0109766 A1 | 4/2019 | Bodog et al. | |
| 2019/0238425 A1 | 8/2019 | Mladin et al. | |
| 2019/0260690 A1* | 8/2019 | Sun | H04L 47/2425 |
| 2019/0379728 A1* | 12/2019 | Hellstrom | G06F 9/5072 |

FOREIGN PATENT DOCUMENTS

| | | |
|---|---|---|
| EP | 3160073 | 4/2017 |
| JP | 2016149686 | 8/2016 |
| WO | WO 2011/029321 | 3/2011 |
| WO | WO 2012/056404 | 5/2012 |
| WO | WO 2015/065353 | 5/2015 |
| WO | WO 2015/180559 | 12/2015 |
| WO | WO 2015/187337 | 12/2015 |
| WO | WO 2016/004556 | 1/2016 |
| WO | WO 2016/058245 | 4/2016 |
| WO | WO 2017/011607 | 1/2017 |

OTHER PUBLICATIONS

"OpenNebula 4.6 User Guide," Jun. 12, 2014, opennebula.org, pp. 1-87.

Aldrin, S., et al. "Service Function Chaining Operation, Administration and Maintenance Framework," Internet Engineering Task Force, Oct. 26, 2014, 13 pages.

Alizadeh, Mohammad, et al., "CONGA: Distributed Congestion-Aware Load Balancing for Datacenters," SIGCOMM '14, Aug. 17-22, 2014, 12 pages.

Author Unknown, "ANSI/SCTE 35 2007 Digital Program Insertion Cueing Message for Cable," Engineering Committee, Digital Video Subcommittee, American National Standard, Society of Cable Telecommunications Engineers, ©Society of Cable Telecommunications Engineers, Inc. 2007 All Rights Reserved, 140 Philips Road, Exton, PA 19341; 42 pages.

Author Unknown, "AWS Lambda Developer Guide," Amazon Web Services Inc., May 2017, 416 pages.

Author Unknown, "CEA-708," from Wikipedia, the free encyclopedia, Nov. 15, 2012; 16 pages http://en.wikipedia.org/w/index.php?title=CEA-708&oldid=523143431.

Author Unknown, "Cisco and Intel High-Performance VNFs on Cisco NFV Infrastructure," White Paper, Cisco and Intel, Oct. 2016, 7 pages.

Author Unknown, "Cloud Functions Overview," Cloud Functions Documentation, Mar. 21, 2017, 3 pages; https://cloud.google.com/functions/docs/concepts/overview.

(56) References Cited

OTHER PUBLICATIONS

Author Unknown, "Cloud-Native VNF Modelling," Open Source Mano, ©ETSI 2016, 18 pages.
Author Unknown, "Digital Program Insertion," from Wikipedia, the free encyclopedia, Jan. 2, 2012; 1 page http://en.wikipedia.org/w/index.php?title=Digital_Program_insertion&oldid=469076482.
Author Unknown, "Dynamic Adaptive Streaming over HTTP," from Wikipedia, the free encyclopedia, Oct. 25, 2012; 3 pages, http://en.wikipedia.org/w/index.php?title=Dynannic_Adaptive_Streanning_over_HTTP&oldid=519749189.
Author Unknown, "GStreamer and in-band metadata," from RidgeRun Developer Connection, Jun. 19, 2012, 5 pages https://developersidgerun.conn/wiki/index.php/GStreanner_and_in-band_nnetadata.
Author Unknown, "IEEE Standard for the Functional Architecture of Next Generation Service Overlay Networks, IEEE Std. 1903-2011," IEEE, Piscataway, NJ, Oct. 7, 2011; 147 pages.
Author Unknown, "ISO/IEC JTC 1/SC 29, Information Technology—Dynamic Adaptive Streaming over HTTP (DASH)—Part 1: Media Presentation Description and Segment Formats," International Standard ©ISO/IEC 2012—All Rights Reserved; Jan. 5, 2012; 131 pages.
Author Unknown, "M-PEG 2 Transmission," ©Dr. Gorry Fairhurst, 9 pages [Published on or about Jan. 12, 2012] http://www.erg.abdn.ac.uk/future-net/digital-video/mpeg2-trans.html.
Author Unknown, "MPEG Transport Stream," from Wikipedia, the free encyclopedia, Nov. 11, 2012; 7 pages, http://en.wikipedia.org/w/index.php?title=MPEG_transport_streann&oldid=522468296.
Author Unknown, "Network Functions Virtualisation (NFV); Use Cases," ETSI, GS NFV 001 v1.1.1, Architectural Framework, © European Telecommunications Standards Institute, Oct. 2013, 50 pages.
Author Unknown, "Understanding Azure, A Guide for Developers," Microsoft Corporation, Copyright ©2016 Microsoft Corporation, 39 pages.
Author Unknown, "3GPP TR 23.803 V7.0.0 (Sep. 2005) Technical Specification: Group Services and System Aspects; Evolution of Policy Control and Charging (Release 7)," 3rd Generation Partnership Project (3GPP), 650 Route des Lucioles—Sophia Antipolis Valbonne—France, Sep. 2005; 30 pages.
Author Unknown, "3GPP TS 23.203 V8.9.0 (Mar. 2010) Technical Specification: Group Services and System Aspects; Policy and Charging Control Architecture (Release 8)," 3rd Generation Partnership Project (3GPP), 650 Route des Lucioles—Sophia Antipolis Val bonne—France, Mar. 2010; 116 pages.
Author Unknown, "3GPP TS 23.401 V13.5.0 (Dec. 2015) Technical Specification: 3rd Generation Partnership Project; Technical Specification Group Services and System Aspects; General Packet Radio Service (GPRS) enhancements for Evolved Universal Terrestrial Radio Access Network (E-UTRAN) access (Release 13)," 3GPP, 650 Route des Lucioles—Sophia Antipolis Valbonne—France, Dec. 2015, 337 pages.
Author Unknown, "3GPP TS 23.401 V9.5.0 (Jun. 2010) Technical Specification: Group Services and Systems Aspects; General Packet Radio Service (GPRS) Enhancements for Evolved Universal Terrestrial Radio Access Network (E-UTRAN) Access (Release 9)," 3rd Generation Partnership Project (3GPP), 650 Route des Lucioles—Sophia Antipolis Valbonne—France, Jun. 2010; 259 pages.
Author Unknown, "3GPP TS 29.212 V13.1.0 (Mar. 2015) Technical Specification: 3rd Generation Partnership Project; Technical Specification Group Core Network and Terminals; Policy and Charging Control (PCC); Reference points (Release 13)," 3rd Generation Partnership Project (3GPP), 650 Route des Lucioles— Sophia Antipolis Valbonne—France, Mar. 2015; 230 pages.
Author Unknown, "Service-Aware Network Architecture Based on SDN, NFV, and Network Intelligence," 2014, 8 pages.
Baird, Andrew, et al. "AWS Serverless Multi-Tier Architectures; Using Amazon API Gateway and AWS Lambda," Amazon Web Services Inc., Nov. 2015, 20 pages.
Bi, Jing, et al., "Dynamic Provisioning Modeling for Virtualized Multi-tier Applications in Cloud Data Center," 2010 IEEE 3$^{rd}$ International Conference on Cloud Computing, Jul. 5, 2010, pp. 370-377, IEEE Computer Society.
Bitar, N., et al., "Interface to the Routing System (I2RS) for the Service Chaining: Use Cases and Requirements," draft-bitar-i2rs-service-chaining-01, Feb. 14, 2014, pp. 1-15.
Boucadair, Mohamed, et al., "Differentiated Service Function Chaining Framework," Network Working Group Internet Draft draft-boucadair-network-function-chaining-03, Aug. 21, 2013, 21 pages.
Bremler-Barr, Anat, et al., "Deep Packet Inspection as a Service," CoNEXT '14, Dec. 2-5, 2014, pp. 271-282.
Cisco Systems, Inc. "Cisco NSH Service Chaining Configuration Guide," Jul. 28, 2017, 11 pages.
Cisco Systems, Inc. "Cisco VN-LINK: Virtualization-Aware Networking," 2009, 9 pages.
Dunbar, et al., "Architecture for Chaining Legacy Layer 4-7 Service Functions," IETF Network Working Group Internet Draft, draft-dunbar-sfc-legacy-14-17-chain-architecture-03.txt, Feb. 10, 2014; 17 pages.
Ersue, Mehmet, "ETSI NFV Management and Orchestration-An Overview," Presentation at the IETF# 88 Meeting, Nov. 3, 2013, 14 pages.
Farrel, A., et al., "A Path Computation Element (PCE)—Based Architecture," RFC 4655, Network Working Group, Aug. 2006, 40 pages.
Fayaz, Seyed K., et al., "Efficient Network Reachability Analysis using a Succinct Control Plane Representation," 2016, ratul.org, pp. 1-16.
Halpern, Joel, et al., "Service Function Chaining (SFC) Architecture," Internet Engineering Task Force (IETF), Cisco, Oct. 2015, 32 pages.
Hendrickson, Scott, et al. "Serverless Computation with OpenLambda," Elastic 60, University of Wisconson, Madison, Jun. 20, 2016, 7 pages, https://www.usenix.org/system/files/conference/hotcloud16/hotcloud16_hendrickson.pdf.
Jiang, Y., et al., "An Architecture of Service Function Chaining," IETF Network Working Group Internet Draft, draft-jiang-sfc-arch-01.txt, Feb. 14, 2014; 12 pages.
Jiang, Yuanlong, et al., "Fault Management in Service Function Chaining," Network Working Group, China Telecom, Oct. 16, 2015, 13 pages.
Katsikas, Goergios P., et al., "Profiling and accelerating commodity NFV service chains with SCC," The Journal of Systems and Software, vol. 127, Jan. 2017, pp. 12-27.
Kumar, Surendra, et al., "Service Function Path Optimization: draft-kumar-sfc-sfp-optimization-00.txt," Internet Engineering Task Force, IETF; Standard Working Draft, May 10, 2014, 14 pages.
Kumbhare, Abhijit, et al., "Opendaylight Service Function Chaining Use-Cases," Oct. 14, 2014, 25 pages.
Li, Hongyu, "Service Function Chaining Use Cases", IETF 88 Vancouver, Nov. 7, 2013, 7 pages.
Mortensen, A., et al., "Distributed Denial of Service (DDoS) Open Threat Signaling Requirements," DOTS, Mar. 18, 2016, 16 pages; https://tools.ietf.org/pdf/draft-ietf-dots-requirements-01.pdf.
Newman, David, "Review: FireEye fights off multi-stage malware," Network World, May 5, 2014, 7 pages.
Nguyen, Kim-Khoa, et al. "Distributed Control Plane Architecture of Next Generation IP Routers," IEEE, 2009, 8 pages.
Penno, Reinaldo, et al. "Packet Generation in Service Function Chains," draft-penno-sfc-packet-03, Apr. 29, 2016, 25 pages.
Penno, Reinaldo, et al. "Services Function Chaining Traceroute," draft-penno-sfc-trace-03, Sep. 30, 2015, 9 pages.
Pierre-Louis, Marc-Arhtur, "OpenWhisk: A quick tech preview," DeveloperWorks Open, IBM, Feb. 22, 2016, modified Mar. 3, 2016, 7 pages; https://developer.IBM.com/open/2016/02/22/openwhisk-a-quick-tech-preview/.
Pujol, Pua Capdevila, "Deployment of NFV and SFC scenarios," EETAC, Master Thesis, Advisor: David Rincon Rivera, Universitat Politecnica De Catalunya, Feb. 17, 2017, 115 pages.
Quinn, P., et al., "Network Service Header," Network Working Group, Mar. 24, 2015, 42 pages; https://tools.ietf.org/pdf/draft-ietf-sfc-nsh-00.pdf.
Quinn, P., et al., "Network Service Chaining Problem Statement," draft-quinn-nsc-problem-statement-03.txt, Aug. 26, 2013, 18 pages.

(56) References Cited

OTHER PUBLICATIONS

Quinn, Paul, et al., "Network Service Header," Network Working Group, draft-quinn-sfc-nsh-02.txt, Feb. 14, 2014, 21 pages.
Quinn, Paul, et al., "Network Service Header," Network Working Group, draft-quinn-nsh-00.txt, Jun. 13, 2013, 20 pages.
Quinn, Paul, et al., "Network Service Header," Network Working Group Internet Draft draft-quinn-nsh-01, Jul. 12, 2013, 20 pages.
Quinn, Paul, et al., "Service Function Chaining (SFC) Architecture," Network Working Group Internet Draftdraft-quinn-sfc-arch-05.txt, May 5, 2014, 31 pages.
Quinn, Paul, et al., "Service Function Chaining: Creating a Service Plane via Network Service Headers," IEEE Computer Society, 2014, pp. 38-44.
Wong, Fei, et al., "SMPTE-TT Embedded in ID3 for HTTP Live Streaming, draft-smpte-id3-http-live-streaming-00," Informational Internet Draft, Jun. 2012, 7 pages http://tools.ietf.orq/htnnl/draft-snnpte-id3-http-live-streaming-00.
Yadav, Rishi, "What Real Cloud-Native Apps Will Look Like," Crunch Network, posted Aug. 3, 2016, 8 pages; https://techcrunch.com/2016/08/03/what-real-cloud-native-apps-will-look-like/.
Zhang, Ying, et al. "StEERING: A Software-Defined Networking for Inline Service Chaining," IEEE, 2013, IEEE, p. 10 pages.

* cited by examiner

VNF MANAGEMENT USER INTERFACE SCREEN — 410

| | VNF Name | Number of CPUs | Amount of Memory | Hardisk Capacity |
|---|---|---|---|---|
| ○ | Deployment-1 | 13 | 03 | 06 |
| ○ | Deployment-2 | 43 | 09 | 05 |
| ● | Deployment-3 | 43 | 12 | 16 |
| ○ | | | | |
| ○ | | | | |
| ○ | | | | |

414a, 414b, 414c, 414d, 414e

412

416 Release    418 Restore

RELEASING AND RETAINING RESOURCES FOR USE IN A NFV ENVIRONMENT

CROSS-REFERENCE TO RELATED APPLICATION

This application is a continuation of U.S. patent application Ser. No. 15/625,032 filed on Jun. 16, 2017, the contents of which is incorporated by reference in its entirety.

TECHNICAL FIELD

The disclosure relates generally to computer networking tools, and more particularly to a system and method for releasing and retaining resources in a network functions virtualization environment.

BACKGROUND

Due to recent network focused advancements in computing hardware, services that were previously only capable of being delivered by proprietary, application-specific hardware can now be provided using software running on computing hardware by utilizing virtualization techniques that run on high-volume server, switch, and storage computing hardware to virtualize network functions. By leveraging virtualization technology to consolidate different types of network equipment onto the computing hardware, switches, storage, and network functions, such as network address translation (NAT), firewalling, intrusion detection, domain name service (DNS), load balancing, caching, and the like can be decoupled from computing hardware and can instead be run as software. This virtualization of network functions on commodity hardware is sometimes referred to as Network Functions Virtualization (NFV).

Network Functions Virtualization (NFV) refers to a technology that is used to design a network structure with industry standard servers, switches, and storage that are provided as devices at a user end. That is, the NFV technology implements network functions as software that can be run in existing industry standard servers and hardware. NFV technology may also be supported by a cloud computing technology and in some cases, may also utilize various industry-standard high volume server technologies.

In an effort to develop a fully virtualized infrastructure, leading service providers have collaborated together to create the European Telecommunications Standards Institute (ETSI) Industry Specification Group (ISG) for Network Functions Virtualization (NFV) working group. This group has helped create the architecture and associated requirements for virtualizing various functions within telecommunications networks. Benefits of NFV include reduced capital expenditure (e.g., by reducing the need to purchase purpose-built hardware), operating expenditure (e.g., by reducing space, power, and cooling requirements), reduced time-to-market (e.g., accelerated deployment), improved flexibility to address constantly changing demands, and the like.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

Overview

Disclosed are systems, methods and computer-readable devices related to a virtual network function (VNF) service that, when a VNF is un-deployed with the intention of changing or tuning some configuration and instantiating it again, the underlying resources used to support that VNF are not released to be used by other VNFs. Many scenarios exist where the VNF needs to be un-deployed (e.g., brought down) to fix or change a configuration mistake that was done while instantiating the VNF. Embodiments of the present disclosure provide a system, method, and computer-readable instructions to maintain the resources in a dedicated condition in relation to the VNF so that, after the VNF has been un-deployed, the VNF may again be re-deployed on those dedicated resources.

Additional systems, methods and computer-readable devices provide a user interface that displays existing VNFs and a means to un-deploy the VNF instances. When users are finished reconfiguring and making changes to the VNF, they can reinstate the VNF. While un-deployed, the NFV orchestration framework does not release the resources, such as central processing units (CPUs), memory, disk space, and the like, back to the cloud. Additionally, the user interface provides means for releasing the resources back to the cloud in the event that the VNF is no longer needed or desired.

Description

Figure 1:
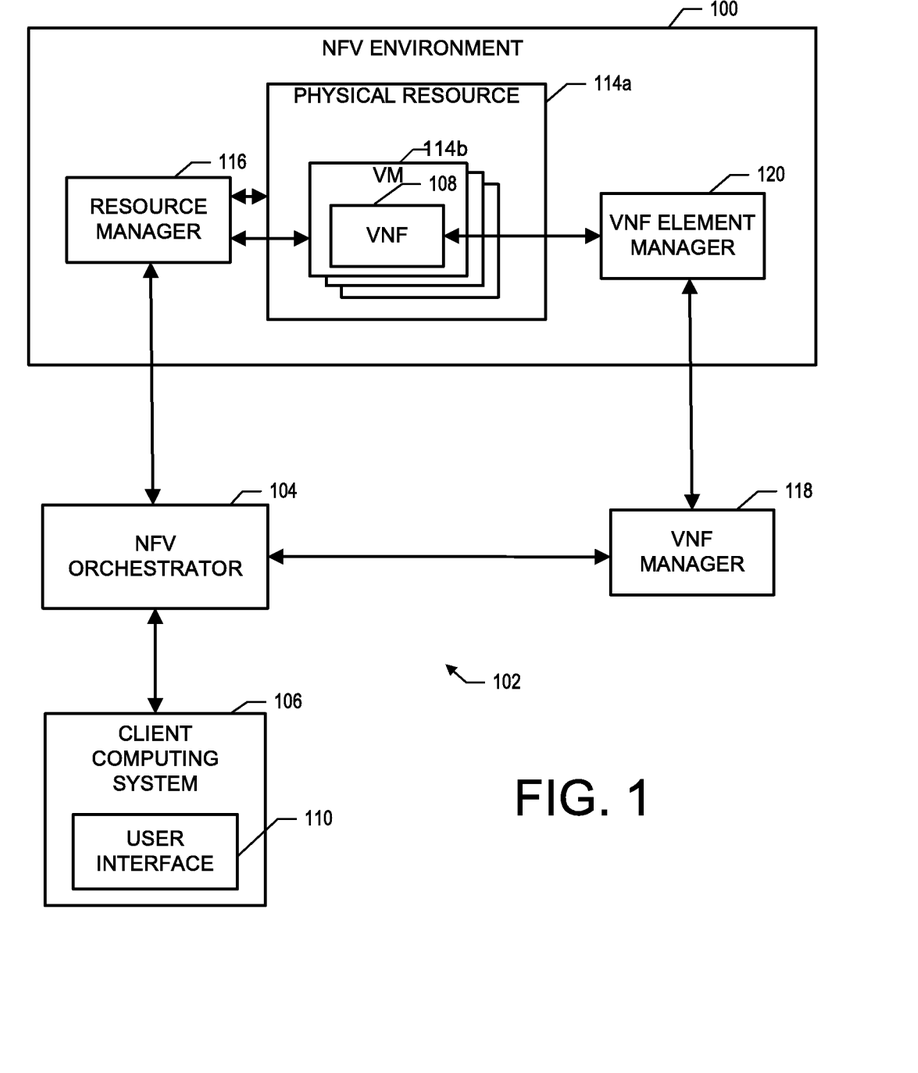
FIG. 1 illustrates an example network functions virtualization (NFV) environment in which a virtual network function (VNF) management system for releasing and retaining cloud resources may be embodied.

FIG. 1 illustrates an example network functions virtualization (NFV) environment 100 in which a virtual network function (VNF) management system 102 for releasing and retaining cloud resources may be embodied. The system 102 includes a NFV orchestrator 104 that communicates with a client computing device 106 to configure and deploy a VNF 108 on one or more resources 114 in the NFV environment 100. According to embodiments of the present disclosure, the NFV orchestrator 104 provides a technique for, when a previously deployed VNF 108 is to be temporarily un-deployed for some reason, such as to fix a configuration mistake in the VNF 108, the resources 114 used to support the VNF 108 are maintained in a dedicated condition in relation to the VNF 108 so that the VNF 108 may again be deployed on those same resources. In additional embodiments, the system 102 also provides a user interface 110 for displaying the VNF 108 in a deployed or an un-deployed condition, receiving user input to re-deploy the VNF 108, and/or un-deploy the underlying resources when use of the VNF 108 is no longer needed or desired.

In general, VNFs 108 configured in a NFV environment are typically deployed using a technique as specified according to a specification, such as the European Telecommunications Standards Institute (ETSI) Industry Specification Group (ISG) for Network Functions Virtualization (NFV) working group. The ETSI/ISG/NFV specification specifies a certain sequence of operations that should be performed so that, among other things, the resulting VNFs 108 function properly in a consistent manner, and that the resources used to support those functions have ample performance capabilities. Additionally, when the VNF 108 is un-deployed, the specification specifies certain other operations that should be performed so that the VNF 108 is properly un-deployed, and that the resources allocated to the VNF 108 is given back to a resource pool so that those resources may be used by other VNFs.

In some cases, it would be beneficial to temporarily un-deploy the VNF 108. For example, the VNF 108 may have been deployed using a port assignment that is incompatible with another VNF 108, such as via a static Internet protocol (IP) address, or a target IP address/port for a remote destination that is mis-configured during deployment of the VNF 108. To fix these problems, the VNF 108 could un-deployed and re-deployed; however, conventional techniques for deploying VNFs 108, such as those promulgated by the ETSI/ISG/NFV specification, specifies that the underlying resources are also de-allocated when the VNF 108 is un-deployed, thus releasing the resources 114 back to a common pool to be used by other VNFs 108.

Although de-allocating the underlying resources used to support a VNF may appear to provide an adequate solution, it may engender other problems. For example, the physical location of the allocated resources 114 may be proximate to and/or have similar performance characteristics to other resources 114 used to support another VNF 108 that is to be used with the subject VNF 108. Thus, in this case, it would be beneficial to keep those resources 114 dedicated for use with the VNF 108 so that, when the VNF 108 is temporarily un-deployed, those resources 114 may again be used for supporting the VNF 108 in the NFV environment. Additionally, de-allocation and re-allocation of the underlying resources can be a time consuming task that often is an inefficient and cumbersome endeavor.

Certain embodiments of the present disclosure provide a solution to this problem by providing a system that allows a VNF 108 to be un-deployed and re-deployed using a technique that maintains the underlying resources used to support the VNF 108 in a dedicated state relative to the VNF 108. Thus, a VNF 108 can be un-deployed and re-deployed to leverage the advantages of any initialization processes configured for that VNF 108, while ensuring that the underlying resources remain available to support that VNF 108 when it is re-deployed.

The resources 114 on which the VNF 108 may be deployed may be embodied on any suitable computing architecture having multiple resources 114 for supporting the VNF 108. For example, the NFV environment 100 may include a unified computing system, a fabric-based computing system, a dynamic infrastructure, and/or a combination thereof In a particular example, the NFV environment 100 may include a virtualized computing environment having one or more physical resources 114a that execute one or more virtual machine (VM) resources 114b. It should be understood that the NFV environment 100 may include other components, such as gateways for secure management of data used by the VNF 108, communication nodes for communication among multiple computing systems, and/or other devices that support the overall operation of the NFV environment 100.

The NFV environment 100 may involve multiple computing components pre-integrated into an optimized computing solution. The computing components of the NFV environment 100 may include servers, data storage components, networking equipment and software for managing the integrated components. To assist in the scalability, management and sharing of resources, particularly in large computing system environments, the NFV environment 100 may include a pool of server, storage and networking resources, typically virtualized, that can be shared by multiple VNFs 108.

Example hardware resources 114a of the NFV environment 100 may include any type of hardware that provides physical resources for the virtual computing environment, while the virtual resources 114b include logical entities, such as virtual machines, virtual switches, virtual storage units, containers, and other forms of partitioning constructs. Virtual resources 114b may also include logical configuration constructs, such as storage partitions, port groups, virtual private clouds, virtual local area networks (LANs), private virtual data centers (PVDCs), that may be individually allocated to one or more VNFs. These hardware resources 114a and virtual resources 114b function in a collaborative manner to support the VNFs 108.

The resources 114 of the NFV environment 100 may be managed by a resource manager 116. Generally speaking, the resource manager 116 communicates with the physical resources 114a and virtual resources 114b (e.g., VMs) of the NFV environment 100 to manipulate the operation of the resources 114, as well as obtain status information, and report the status information to a user. In some embodiments, the resource manager 116 may function according to an OpenStack™ software platform. For an example in which the NFV environment 100 includes a virtualized computing environment, the compute resources may be managed by an element management application 106, such as a Unified Compute System Management (UCSM) application that is available from Cisco Systems.

The VNF manager 118 may include any type that manages the operation of the VNF 108, and communicates with the NFV orchestrator 104 for deploying the VNF 108 on the resources 114 of the NFV environment 100 through an VNF element manager 120. In some embodiments, the VNF manager 118 functions according to an operational support system (OSS) that manages various operations of the VNF 108 as well as other VNF related devices in the NFV environment 100. The VNF element manager 120 may be included to, among other things, provide network configuration of each or a combination of VNFs 108, network inventory of VNFs 108 in the NFV environment 100, network configuration of VNFs in the NFV environment 100, and fault management of VNFs in the NFV environment 100.

Figure 2:
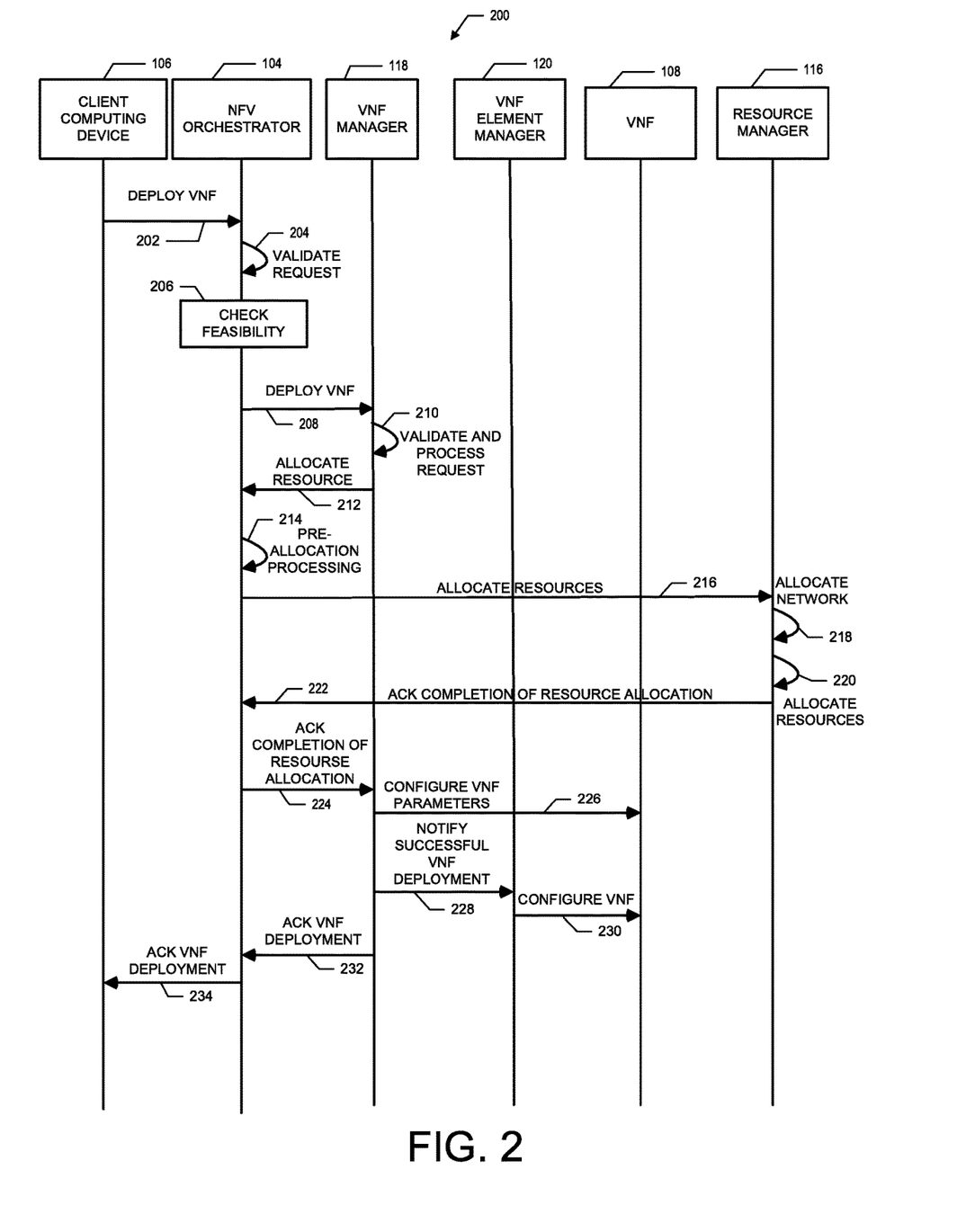
FIG. 2 illustrates a call flow diagram showing how the system deploys a VNF in the NFV environment according to some embodiments of the present disclosure.

FIG. 2 illustrates a call flow diagram 200 showing how the system 102 deploys the VNF 108 in the NFV environment according to some embodiments of the present disclosure. At step 202, the NFV orchestrator 104 receives a request from the client computing device 106 for deploying the VNF 108. Thereafter at step 204, the NFV orchestrator 104 validates the request. For example, the NFV orchestrator 104 may validate the request by ensuring the client computing device 106 is authorized to request deployment of the VNF 108 and/or a type of the VNF 108 requested by the client computing device 106. The NFV orchestrator 104 may also check the feasibility of the VNF deployment at step 206. For example, the NFV orchestrator 104 may check the request against one or more rules or policies to ensure that the VNF 108 and/or characteristics of the VNF 108 are supported by the NFV environment 100.

At step 208, the NFV orchestrator 104 transmits a request to the VNF manager 118 to deploy the VNF 108. In turn, the VNF manager responds by validating the request at step 210. For example, the VNF manager 118 may validate the request by ensuring sufficient resource capacity exist for fulfilling the request, and/or that the NFV environment possesses the capabilities for deploying the VNF 108 using certain parameters to be associated with the VNF 108 included in the request. When the request is validated at step 210, the VNF manager 118 transmits a response to the request back to the NFV orchestrator 104 requesting that certain resources 114 be allocated for supporting the VNF 108.

At step 214, the NFV orchestrator 104 performs one or more pre-allocation processing for deploying the VNF 108. For example, the NFV orchestrator 104 may update records stored in its memory indicating certain characteristics of the VNF 108, such as information associated with the user who issued the request through the client computing device 106, accounting information (e.g., lease information) to be assessed to the user for use of the VNF 108, and the like. According to some embodiments, the NFV orchestrator may also store identifying information for the resources 114 so that they may be dedicated for use with the VNF 108.

Thereafter at step 216, the NFV orchestrator 104 transmits a request to the resource manager 116 to allocate one or more resources 114 for the VNF 108. In turn, the resource manager 116 allocates its internal connectivity network at step 218 to support the resources 114. For example, the resource manager 116 may deploy and configure one or more virtual network resources 114 (e.g., a load balancer, a router, etc.) that are to be used by certain other resources 114 for supporting the VNF 108. Thereafter at step 220, the resource manager 116 allocates the other resources 114 (e.g., VMs) and attaches the resources 114 to the network configured at step 218. The resource manager 116 then transmits an acknowledgement message back to the NFV orchestrator 104 in response to the request transmitted at step 216 indicating that the resources 114 of the NFV environment 100 have been allocated to support the VNF 108 at step 222.

At step 224, the NFV orchestrator 104 transmits an acknowledgement message back to the VNF manager 118 indicating that the resources 114 of the NFV environment 100 have been successfully allocated. As a result, the VNF manager 118 configures the VNF 108 with deployment specific parameters (e.g., port assignments, routing tables, routing rules, etc.). For example, the VNF manager 118 may communicate with certain resources 114 configured by the resource manager 116 in steps 218 and 220 with additional parameters necessary for implementing the VNF 108. The VNF manager 118 also notifies the VNF element manager 120 that the VNF has been successfully deployed at step 228. Thereafter at step 230, the VNF element manager 120 configures the newly deployed VNF 108 with any particular parameters obtained from the VNF manager 118 at step 230.

At step 232, the VNF manager 118 transmits an acknowledgement message to the NFV orchestrator 104 indicating that the VNF 108 has been successfully deployed in which the NFV orchestrator 104 responds by transmitting an acknowledgement message to the client computing device 106 with the indication at step 234.

At this point, the VNF 108 has been deployed and is available for use by the user of the client computing device 106.

Figure 3:
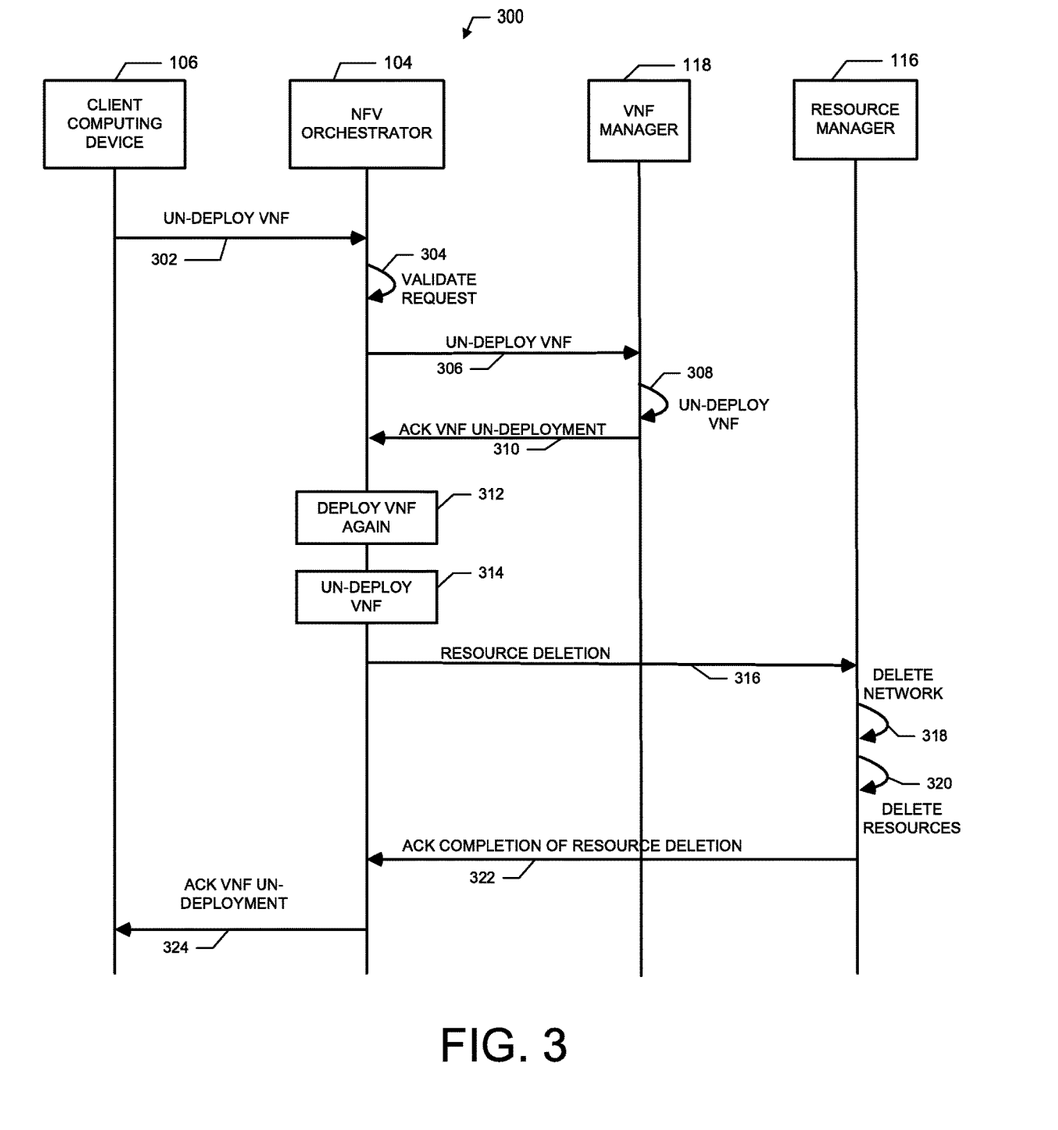
FIG. 3 illustrates an example call flow diagram that may be performed by the system according to some embodiments of the present disclosure.

FIG. 3 illustrates an example call flow diagram 300 that may be performed by the system 102 according to some embodiments of the present disclosure. Initially, the VNF 108 has been previously deployed in the NFV environment 100. For example, the steps of the call flow diagram 300 may be performed after the steps of 202-234 have been performed as shown and described above with respect to FIG. 2.

At step 302, the NFV orchestrator 104 receives a request from the client computing device 106 to un-deploy (e.g., terminate) the VNF 108. Thereafter at step 304, the NFV orchestrator 104 validates the request. For example, the NFV orchestrator 104 may validate the request by ensuring the client computing device 106 is authorized to request un-deployment of the VNF 108. At step 306, the NFV orchestrator 104 transmits a request to the VNF manager 118 to un-deploy the VNF 108, in which the VNF manager 118 responds by un-deploying the VNF 108 at step 308. The VNF manager 118 then transmits an acknowledgement message to the NFV orchestrator 104 indicating that the VNF 108 has been successfully un-deployed from the NFV environment 100 at step 310.

At this point, the VNF 108 has been un-deployed from the NFV environment 100, while the resources 114 remain allocated for use with the VNF 108. For example, although the VNF 108 has been un-deployed at step 310, information associated with the resources 114 used to support the VNF 108 that has been stored at step 214 (See FIG. 2) remains persistent in the NFV orchestrator 104. Thus, the VNF 108 can be re-deployed on those same resources 114 using information stored in the NFV orchestrator 104. In one aspect, the resources 114 remain allocated to the VNF 108 because the resource manager 116 has not yet been notified that the underlying resources 114 used to support the VNF 108 has been un-deployed. Thus, the resource manager 116 receives no request to de-allocate the resources 114 used to support the VNF 108 and therefore does not de-allocated those resources 114. Additionally, because the resources 114 remain allocated for use with the VNF 108, other VNFs are restricted from using those resources 114.

At step 312, the NFV orchestrator 104 again deploys the VNF 108 using the resources 114 that have been previously allocated. In some embodiments, the system 102 may deploy the VNF 108 in a similar manner that the VNF 108 was deployed in steps 202-212 and 224-234 of FIG. 2. However, rather than performing the one or more pre-allocation processing for deploying the VNF 108 as is performed in step 214, the NFV orchestrator 104 obtains a unique identity of the VNF 108 being deployed, identifies the resources 114 that have been previously allocated to that VNF 108 according to information about the resources 114 stored in its memory, and selects those resources 114 to be used for supporting the VNF 108. At this point, the VNF 108 is now fully deployed again using the resources 114 that have been previously allocated for that VNF 108.

At some later point in time, it may be desired to un-deploy the VNF 108. Therefore, at step 314, the NFV orchestrator 104 may un-deploy the VNF 108 that has been deployed at step 312. For example, the system 102 may un-deploy the VNF 108 in a similar manner that the VNF 108 was un-deployed in steps 302-310. At this point, the VNF 108 has been un-deployed, but the resources 114 used to support the VNF 108 are still allocated for use with that VNF 108. Thus, the VNF 108 may again be deployed by performing step 312 again, or the resources 114 used to support the VNF 108 may be de-allocated so that those resources 114 may be added to the common pool to be used by other VNFs as described herein below at steps 316-324.

At step 316, the NFV orchestrator 104 transmits a request to the resource manager 116 to de-allocate the resources 114 used to support the VNF 108. In turn, the resource manager 116 de-allocates its internal connectivity network at step 318. For example, the resource manager 116 may delete the one or more previously allocated virtual network resources 114 (e.g., load balancers, routers, switches, etc.) that were allocated at step 218. Thereafter at step 320, the resource manager 116 de-allocates the resources 114 (e.g., VMs) allocated at step 220. The resource manager 116 then transmits an acknowledgement message back to the NFV orchestrator 104 indicating that the resources 114 have been de-allocated at step 322. Upon receipt of the acknowledgement message, the NFV orchestrator 104 then transmits an acknowledgement message to the client computing device 106 with the indication at step 324. At this point, the resources 114 have been de-allocated and are returned to the resource pool to be used to support the deployment of another VNF 108 by the system.

Figure 4A:
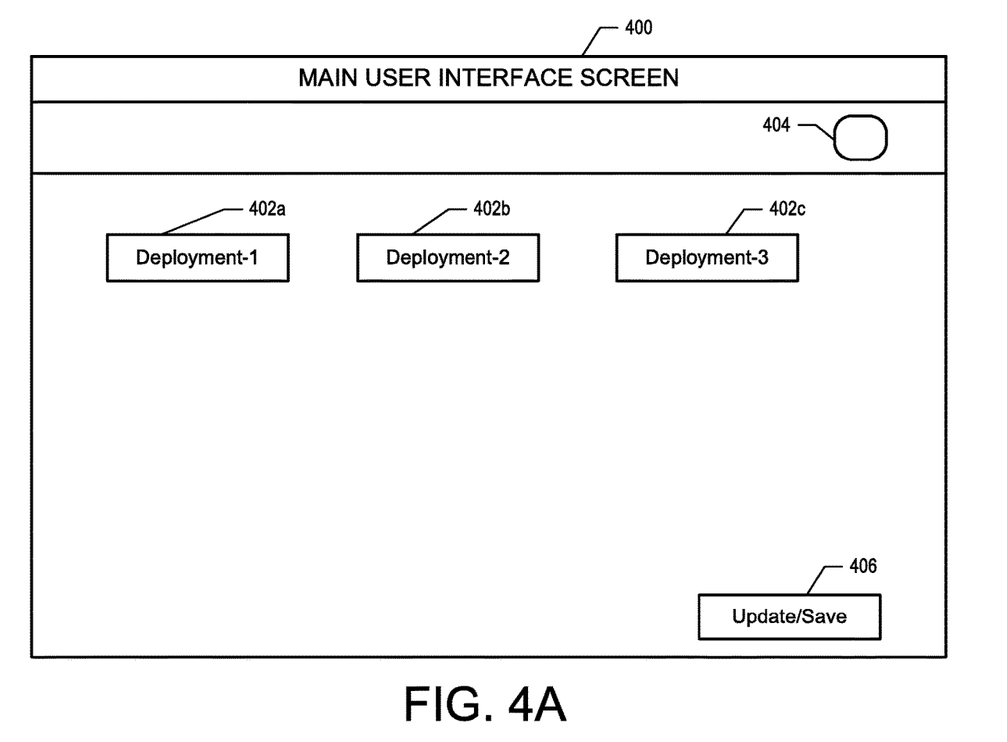
FIGS. 4A and 4B illustrate an example main user interface screen and a VNF management user interface screen, respectively, that may be generated on the client computing device according to some embodiments of the present disclosure.
Figure 4B:
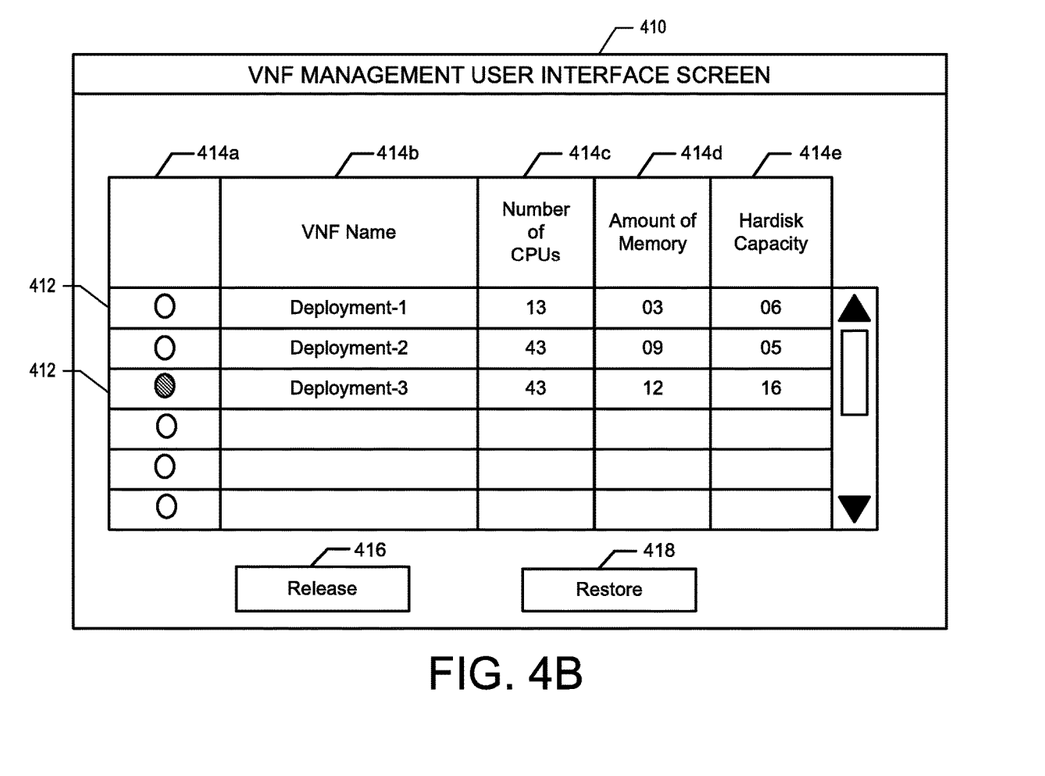

FIGS. 4A and 4B illustrate an example main user interface screen 400 and a VNF management user interface screen 410, respectively, that may be generated on the client computing device 106 according to some embodiments of the present disclosure. The main user interface screen 400 generally displays one or more icons 402 each representing an individual deployed VNF 108 in the system 102. For example, icon 402a may represent a first VNF 108 deployed in the NFV environment 100, icon 402b may represent a second VNF 108 deployed in the NFV environment 100, while icon 402c may represent a third VNF 108 deployed in the NFV environment 100. In a particular example, the VNFs 108 associated with the icons 402 may be generated by the NFV orchestrator 104 when steps 202-234 of FIG. 2 for each VNF 108 have been successfully completed.

The main user interface 400 provides for receiving user input for deploying, un-deploying, modifying, and/or monitoring VNFs 108 in the NFV environment. For example, the main user interface screen 400 may receive user input for performing steps 302-324 for un-deploying the VNF 108 and de-allocating its associated resources 114. The main user interface screen 400 also displays an un-deployment icon 404 that allows the user to un-deploy the VNFs 108 associated with each of the icons 402 shown in the main user interface 400 without de-allocating its underlying resources 114. For example, to un-deploy one of the VNFs 108 without de-allocating its resources 114, one or more of the icons 402 may be selected followed by selection of the un-deployment icon 404. In response to selection of the un-deployment icon 404, the system 102 may generate the VNF management user interface screen 410 as shown in FIG. 4B.

The VNF management user interface screen 410 displays a detailed list of certain parameters associated with each of the icons 402 displayed in the main user interface screen 400. The management user interface screen 410 may display an indication of the VNFs 108 in rows 412 in which certain parameters of each VNF 108 is displayed in columns 414. As shown, the VNF management user interface screen 410 displays a name of the VNF 108 in a column 414b, a number of CPUs allocated to the VNF 108 in column 414c, an amount of volatile memory allocated to the VNF 108 in column 414d, and amount of persistent storage (e.g., hard disk storage) allocated to the VNF 108 in column 414e. Although a VNF name, a number of CPUs, an amount of volatile memory, and an amount of persistent storage are shown, it should be appreciated that any parameter may be displayed in the VNF management user interface screen 410 without departing from the spirit and scope of the present disclosure.

The VNF management user interface screen 410 also includes a column 414a having a selectable field in each row 412 along with a 'Release' button 416 and a 'Restore' button 418 that can be used to un-deploy or re-deploy its associated VNF 108 without unallocating its underlying resources 114. For example, by receiving selection of a field in a row of a particular VNF, followed by selection of the 'Release' button 416, the system 102 may perform steps 302-310 of FIG. 3 to un-deploy that particular VNF 108 without de-allocating its underlying resources 114. Conversely, the system 102 may receive selection of a field in a row of the particular VNF, followed by selection of the 'Restore' button 418 to perform steps 224-234 of FIG. 2 for re-deploying the VNF 108 onto the resources 114 again.

Although FIGS. 4A and 4B illustrate example screens that may be used for receiving user input to un-deploy and re-deploy on resources 114 without de-allocating those resources 114, the system 102 may include additional, fewer, or different entry screens without departing from the spirit and scope of the present disclosure. For example, the system may include one or more other screens for facilitating display of information to the customer, and/or received user input from the customer for other operations to be performed on the VNFs 108.

Figure 5:
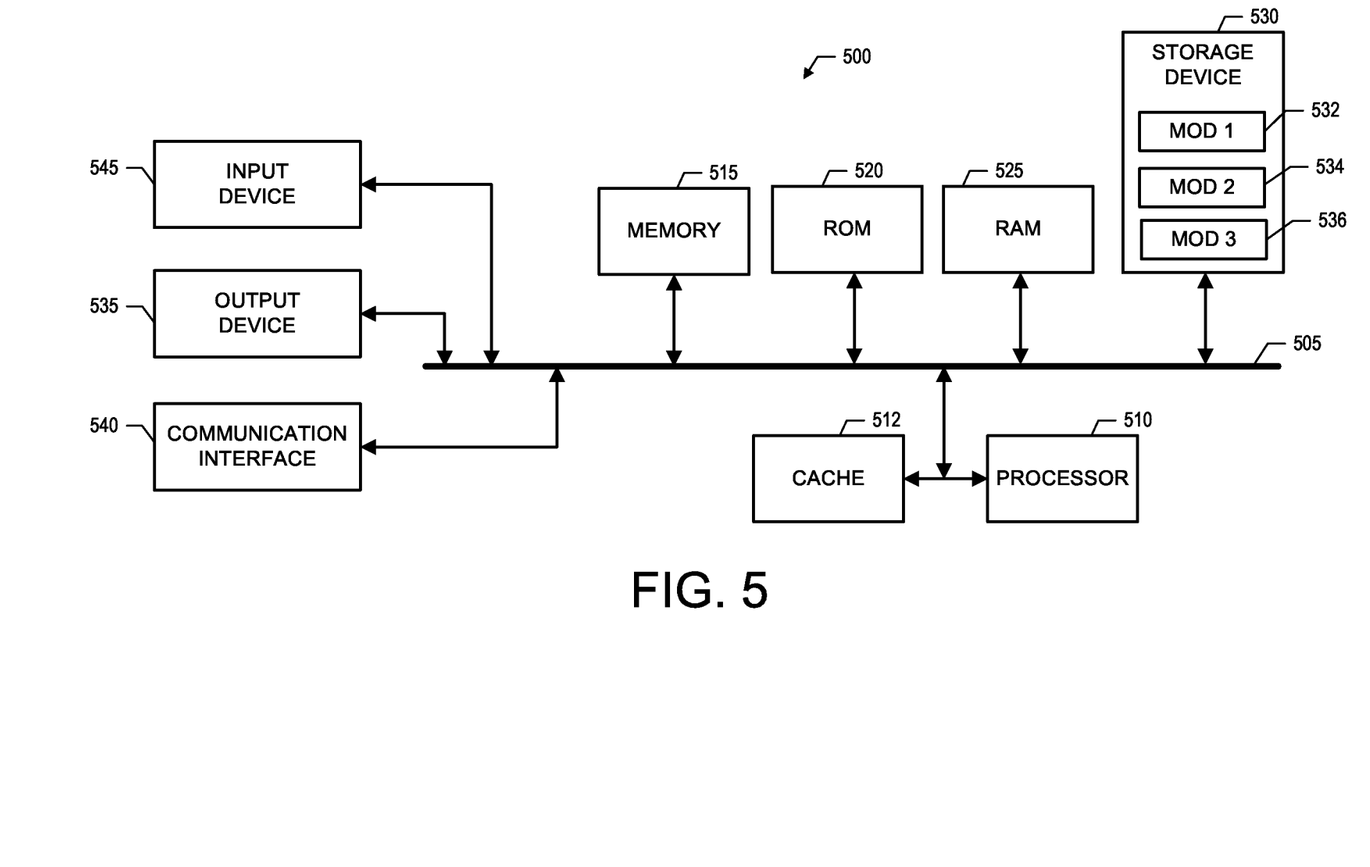
FIG. 5 illustrates the basic computing components of a computing device according to some embodiments of the present disclosure.

FIG. 5 illustrates several basic hardware components that can apply to system examples of the present disclosure. For example, the NFV orchestrator 104, the VNF manager 118, the client computing device 106, the resource manager 116, the VNF element manager 120, and/or the physical resources 114 of the VNF environment 100 may include certain hardware components as described herein.

With reference to FIG. 5, an exemplary system and/or computing device 500 includes a processing unit (CPU or processor) 510 and a system bus 505 that couples various system components including the system memory 515 such as read only memory (ROM) 520 and random access memory (RAM) 525 to the processor 510. The system 502 can include a cache 512 of high-speed memory connected directly with, in close proximity to, or integrated as part of the processor 510. The system 502 copies data from the memory 515, 520, and/or 525 and/or the storage device 530 to the cache 512 for quick access by the processor 510. In this way, the cache provides a performance boost that avoids processor 510 delays while waiting for data. These and other modules can control or be configured to control the processor 510 to perform various operations or actions. Other system memory 515 may be available for use as well. The memory 515 can include multiple different types of memory with different performance characteristics. It can be appreciated that the disclosure may operate on a computing device 500 with more than one processor 510 or on a group or cluster of computing devices networked together to provide greater processing capability. The processor 510 can include any general purpose processor and a hardware module or software module, such as module 1 532, module 2 534, and module 3 536 stored in storage device 530, configured to control the processor 510 as well as a special-purpose processor where software instructions are incorporated into the processor. The processor 510 may be a self-contained computing system, containing multiple cores or processors, a bus, memory controller, cache, etc. A multi-core processor may be symmetric or asymmetric. The processor 510 can include multiple processors, such as a system having multiple, physically separate processors in different sockets, or a system having multiple processor cores on a single physical chip. Similarly, the processor 510 can include multiple distributed processors located in multiple separate computing devices, but working together such as via a communications network. Multiple processors or processor cores can share resources such as memory 515 or the cache 512, or can operate using independent resources. The processor 510 can include one or more of a state machine, an application specific integrated circuit (ASIC), or a programmable gate array (PGA) including a field PGA.

The system bus 505 may be any of several types of bus structures including a memory bus or memory controller, a peripheral bus, and a local bus using any of a variety of bus architectures. A basic input/output system (BIOS) stored in ROM 520 or the like, may provide the basic routine that helps to transfer information between elements within the computing device 500, such as during start-up. The computing device 500 further includes storage devices 530 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 530 is connected to the system bus 505 by a drive interface. The drives and the associated computer-readable storage devices provide non-volatile storage of computer-readable instructions, data structures, program modules and other data for the computing device 500. In one aspect, a hardware module that performs a particular function includes the software component stored in a tangible computer-readable storage device in connection with the necessary hardware components, such as the processor 510, bus 505, an output device such as a display 535, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the computing device 500 is a small, handheld computing device, a desktop computer, or a computer server. When the processor 510 executes instructions to perform "operations", the processor 510 can perform the operations directly and/or facilitate, direct, or cooperate with another device or component to perform the operations.

Although the exemplary embodiment(s) described herein employs a storage device such as a hard disk 530, other types of computer-readable storage devices which can store data that are accessible by a computer, such as magnetic cassettes, flash memory cards, digital versatile disks (DVDs), cartridges, random access memories (RAMs) 525, read only memory (ROM) 520, a cable containing a bit stream and the like, may also be used in the exemplary operating environment. According to this disclosure, tangible computer-readable storage media, computer-readable storage devices, computer-readable storage media, and computer-readable memory devices, expressly exclude media such as transitory waves, energy, carrier signals, electromagnetic waves, and signals per se.

To enable user interaction with the computing device 500, an input device 545 represents any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems enable a user to provide multiple types of input to communicate with the computing device 500. The communications interface 540 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 510. The functions these blocks represent may be provided through the use of either shared or dedicated hardware, including, but not limited to, hardware capable of executing software and hardware, such as a processor 510, that is purpose-built to operate as an equivalent to software executing on a general purpose processor. For example, the functions of one or more processors presented in FIG. 5 can be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 520 for storing software performing the operations described below, and random access memory (RAM) 525 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 502 shown in FIG. 5 can practice all or part of the recited methods, can be a part of the recited systems, and/or can operate according to instructions in the recited tangible computer-readable storage devices. Such logical operations can be implemented as modules configured to control the processor 510 to perform particular functions according to the programming of the module. For example, FIG. 5 illustrates three modules Mod1 532, Mod2 534 and Mod3 536 which are modules configured to control the processor 510. These modules may be stored on the storage device 530 and loaded into RAM 525 or memory 515 at runtime or may be stored in other computer-readable memory locations.

One or more parts of the example computing device 500, up to and including the entire computing device 500, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 510 can include all types of processors disclosed herein, including a virtual processor. However, when referring to a virtual processor, the processor 510 includes the software components associated with executing the virtual processor in a virtualization layer and underlying hardware necessary to execute the virtualization layer. The system 502 can include a physical or virtual processor 510 that receive instructions stored in a computer-readable storage device, which cause the processor 510 to perform certain operations. When referring to a virtual processor 510, the system also includes the underlying physical hardware executing the virtual processor 510.

The various aspects disclosed herein can be implemented as hardware, firmware, and/or software logic embodied in a tangible, i.e., non-transitory, medium that, when executed, is operable to perform the various methods and processes described above. That is, the logic may be embodied as physical arrangements, modules, or components. A tangible medium may be substantially any computer-readable medium that is capable of storing logic or computer program code which may be executed, e.g., by a processor or an overall computing system, to perform methods and functions associated with the examples. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, computer-readable storage device, or a machine-readable medium excludes signals or signals embodied in carrier waves.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A management system comprising:
   at least one processor;
   at least one memory storing instructions which when executed by the at least on processor, cause the at least one processor to:
      un-deploy a virtual network function (VNF) without releasing one or more resources allocated to the VNF into a resource pool, the one or more resources reserved by un-deploying the VNF without notifying a resource manager configured to manage the one or more resources, the one or more resources dedicated to the VNF by the resource manager and restricting other VNFs from using the one or more resources until the one or more resources are released;
      re-deploy the VNF using the one or more resources; and
      un-deploy the VNF and de-allocate the one or more resources allocated to the VNF via a request transmitted to the resource manager.

2. The management system of claim 1, further comprising instructions, which when executed by the at least one processor, cause the at least one processor to:
   display a user interface; and
   the user interface is configured to receive a user input to un-deploy the VNF and display information associated with the one or more resources when the VNF is un-deployed.

3. The management system of claim 2, further comprising instructions, which when executed by the at least one processor, cause the at least one processor to:
   receive a second user input to de-allocate the one or more resources so the one or more resources are no longer dedicated for use with the VNF when the VNF is un-deployed from the one or more resources.

4. The management system of claim 2, wherein the user interface comprises a portion of a NFV orchestrator.

5. The management system of claim 4, wherein the NFV orchestrator is configured to manage a memory with information associated with the one or more resources.

6. The management system of claim 1, further comprising instructions, which when executed by the at least one processor, cause the at least one processor to:
   allocate the one or more resources and deploy the VNF according to a European Telecommunications Standards Institute (ETSI) Industry Specification Group (ISG) for Network Functions Virtualization (NFV) working group specification.

7. The management system of claim 1,
   wherein,
      when the one or more resources are to be maintained for use by the VNF without release back to the resource pool, the resource manager is not notified when the VNF has been un-deployed, and
      when the one or more resources are to be released back to the resource pool, the resource manager is notified when the VNF has been un-deployed.

8. A method comprising:
   un-deploying, by at least one processor, a virtual network function (VNF) without releasing one or more resources allocated to the VNF into a resource pool, the one or more resources reserved by un-deploying the VNF without notifying a resource manager configured to manage the one or more resources, the one or more resources dedicated to the VNF by the resource manager and restricting other VNFs from using the one or more resources until the one or more resources are released;
   re-deploying the VNF using the one or more resources; and
   un-deploying the VNF and de-allocate the one or more resources allocated to the VNF via a request transmitted to the resource manager.

9. The method of claim 8, further comprising:
   displaying a user interface, the user interface receiving user input to un-deploy the VNF; and
   displaying information associated with the one or more resources when the VNF is un-deployed.

10. The method of claim 9, further comprising:
    receiving user input for de-allocating the one or more resources such that the one or more resources are no longer dedicated for use with the VNF when the VNF is un-deployed from the one or more resources.

11. The method of claim 9, wherein the user interface comprises a portion of a NFV orchestrator.

12. The method of claim 11, wherein the NFV orchestrator is configured to manage information associated with the one or more resources.

13. The method of claim 8, further comprising:
allocating the one or more resources and deploying the VNF according to a European Telecommunications Standards Institute (ETSI) Industry Specification Group (ISG) for Network Functions Virtualization (NFV) working group specification.

14. The method of claim 8,
wherein,
when the one or more resources are to be maintained for use by the VNF without release back to the resource pool, the resource manager is not notified when the VNF has been un-deployed, and
when the one or more resources are to be released back to the resource pool, the resource manager is notified when the VNF has been un-deployed.

15. A non-transitory computer-readable medium storing instructions, which when executed by at least one processor, causes the at least one processer to:
un-deploy a virtual network function (VNF) without releasing one or more resources allocated to the VNF into a resource pool, the one or more resources reserved by un-deploying the VNF without notifying a resource manager configured to manage the one or more resources, the one or more resources dedicated to the VNF by the resource manager and restricting other VNFs from using the one or more resources until the one or more resources are released;
re-deploying the VNF using the one or more resources; and
un-deploying the VNF and de-allocate the one or more resources allocated to the VNF via a request transmitted to the resource manager.

16. The non-transitory computer-readable medium of claim 15, further comprising instructions which when executed by the at least on processor, causes the at least one processor to:
display a user interface on a display;
the user interface is configured to receive user input to un-deploy the VNF and display information associated with the one or more resources when the VNF is un-deployed.

17. The non-transitory computer-readable medium of claim 16, further comprising instructions which when executed by the at least on processor, causes the at least one processor to:
receive user input for de-allocating the one or more resources such that the one or more resources are no longer dedicated for use with the VNF when the VNF is un-deployed from the one or more resources.

18. The non-transitory computer-readable medium of claim 16, wherein the user interface comprises a portion of a NFV orchestrator.

19. The non-transitory computer-readable medium of claim 16, wherein the NFV orchestrator is configured to manage a memory with information associated with the one or more resources.

20. The non-transitory computer-readable medium of claim 15, wherein,
when the one or more resources are to be maintained for use by the VNF without release back to the resource pool, the resource manager is not notified when the VNF has been un-deployed, and
when the one or more resources are to be released back to the resource pool, the resource manager is notified when the VNF has been un-deployed.

* * * * *